United States Patent
Overstreet et al.

(10) Patent No.: US 10,221,628 B2
(45) Date of Patent: Mar. 5, 2019

(54) METHODS OF REPAIRING CUTTING ELEMENT POCKETS IN EARTH-BORING TOOLS WITH DEPTH-OF-CUT CONTROL FEATURES

(71) Applicant: Baker Hughes Incorporated, Houston, TX (US)

(72) Inventors: James L. Overstreet, Tomball, TX (US); Kenneth E. Gilmore, Cleveland, TX (US); Travis E. Puzz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 291 days.

(21) Appl. No.: 15/051,417

(22) Filed: Feb. 23, 2016

(65) Prior Publication Data
US 2016/0168918 A1    Jun. 16, 2016

Related U.S. Application Data

(62) Division of application No. 14/602,012, filed on Jan. 21, 2015, now Pat. No. 9,291,002, which is a division
(Continued)

(51) Int. Cl.
*E21B 10/54* (2006.01)
*E21B 10/43* (2006.01)
(Continued)

(52) U.S. Cl.
CPC .............. *E21B 10/54* (2013.01); *B23P 15/28* (2013.01); *E21B 10/43* (2013.01); *E21B 10/55* (2013.01);
(Continued)

(58) Field of Classification Search
CPC .......... E21B 10/54; E21B 10/62; E21B 10/55; E21B 10/43; B23P 15/28; Y10T 29/49982; Y10T 29/49885
See application file for complete search history.

(56) References Cited

U.S. PATENT DOCUMENTS

| 2,198,849 A | 4/1940 | Waxler |
| 2,563,515 A | 8/1951 | Brown |

(Continued)

FOREIGN PATENT DOCUMENTS

| EP | 874128 A2 | 12/2004 |
| GB | 2273946 A | 7/1994 |

(Continued)

OTHER PUBLICATIONS

U.S. Appl. No. 61/080,976, filed Jul. 15, 2008, entitled "Earth-Boring Tools with Preferentially Worn Material and Methods of Making and Using Such Tools."
(Continued)

*Primary Examiner* — Ryan J. Walters
(74) *Attorney, Agent, or Firm* — TraskBritt

(57) ABSTRACT

Methods of repairing earth-boring tools may involve providing wear-resistant material over a temporary displacement member to repair a cutting element pocket in a body and a depth-of-cut control feature using the wear-resistant material. In some embodiments, the wear-resistant material may comprise a particle-matrix composite material. For example, a hardfacing material may be built up over a temporary displacement member to form or repair a cutting element pocket and provide a depth-of-cut control feature. Earth-boring tools may include a depth-of-cut control feature comprising a wear-resistant material. The depth-of-cut control feature may be configured to limit a depth-of-cut of a cutting element secured within a cutting element pocket partially defined by at least one surface of the depth-of-cut
(Continued)

control feature. Intermediate structures formed during fabrication of earth-boring tools may include a depth-of-cut control feature extending over a temporary displacement member.

14 Claims, 4 Drawing Sheets

Related U.S. Application Data of application No. 12/424,248, filed on Apr. 15, 2009, now Pat. No. 8,943,663.

(51) Int. Cl.
*E21B 10/55* (2006.01)
*B23P 15/28* (2006.01)
*E21B 10/62* (2006.01)

(52) U.S. Cl.
CPC ......... *E21B 10/62* (2013.01); *Y10T 29/49885* (2015.01); *Y10T 29/49982* (2015.01)

(56) References Cited

U.S. PATENT DOCUMENTS

| | | |
|---|---|---|
| 2,624,549 A | 1/1953 | Wallace |
| 2,684,835 A | 7/1954 | Moore |
| 2,776,817 A | 1/1957 | Gregory et al. |
| 3,153,458 A | 10/1964 | Short |
| 3,303,894 A | 2/1967 | Varney |
| 3,709,308 A | 1/1973 | Rowley et al. |
| 3,779,323 A | 12/1973 | Horten et al. |
| 3,915,246 A | 10/1975 | Sheshtawy et al. |
| 3,938,599 A | 2/1976 | Horn |
| 4,350,215 A * | 9/1982 | Radtke ............... B23K 1/008 175/433 |
| 4,351,401 A | 9/1982 | Fielder |
| 4,386,669 A | 6/1983 | Evans |
| 4,499,958 A | 2/1985 | Radtke et al. |
| 4,554,986 A | 11/1985 | Jones |
| 4,711,144 A | 12/1987 | Barr et al. |
| 4,718,505 A | 1/1988 | Fuller |
| 4,763,737 A | 8/1988 | Hellnick |
| 4,889,017 A | 12/1989 | Fuller et al. |
| 4,932,484 A | 6/1990 | Warren et al. |
| 4,981,184 A | 1/1991 | Knowlton et al. |
| 4,982,802 A | 1/1991 | Warren et al. |
| 4,991,670 A | 2/1991 | Fuller et al. |
| 5,010,789 A | 4/1991 | Brett et al. |
| 5,042,596 A | 8/1991 | Brett et al. |
| 5,090,492 A | 2/1992 | Keith |
| 5,111,892 A | 5/1992 | Sinor |
| 5,131,478 A | 7/1992 | Brett et al. |
| 5,199,511 A | 4/1993 | Tibbitts et al. |
| 5,244,039 A | 9/1993 | Newton |
| 5,265,685 A | 11/1993 | Keith et al. |
| 5,303,785 A | 4/1994 | Duke |
| 5,314,033 A | 5/1994 | Tibbitts |
| 5,381,850 A | 1/1995 | Otte |
| 5,388,649 A | 2/1995 | Ilomaki |
| 5,402,856 A | 4/1995 | Warren et al. |
| 5,447,208 A | 9/1995 | Lund et al. |
| 5,531,281 A | 7/1996 | Murdock |
| H1566 H | 8/1996 | Azar |
| 5,549,171 A | 8/1996 | Mensa et al. |
| 5,558,170 A | 9/1996 | Thigpen et al. |
| 5,582,258 A | 12/1996 | Tibbitts et al. |
| 5,595,252 A | 1/1997 | O'Hanlon |
| 5,653,300 A | 8/1997 | Lund et al. |
| 5,662,183 A | 9/1997 | Fang |
| 5,663,512 A | 9/1997 | Schader et al. |
| 5,730,234 A | 3/1998 | Putot |
| 5,950,747 A | 9/1999 | Tibbitts et al. |
| 6,298,930 B1 | 10/2001 | Sinor et al. |
| 6,427,792 B1 | 8/2002 | Roberts et al. |
| 6,460,631 B2 | 10/2002 | Dykstra et al. |
| 6,651,756 B1 | 11/2003 | Costo, Jr. et al. |
| 6,659,199 B2 | 12/2003 | Swadi |
| 6,742,611 B1 | 6/2004 | Illerhaus et al. |
| 6,772,849 B2 | 8/2004 | Oldham et al. |
| 6,779,613 B2 | 8/2004 | Dykstra et al. |
| 6,823,952 B1 | 11/2004 | Mensa-Wilmot et al. |
| 6,935,441 B2 | 8/2005 | Dykstra et al. |
| 7,096,978 B2 | 8/2006 | Dykstra et al. |
| 7,360,608 B2 | 4/2008 | Brackin et al. |
| 7,703,555 B2 | 4/2010 | Overstreet |
| 7,814,997 B2 | 10/2010 | Aliko et al. |
| 2001/0030063 A1 | 10/2001 | Dykstra et al. |
| 2004/0069531 A1 | 4/2004 | McCormick et al. |
| 2004/0245022 A1 | 12/2004 | Izaguirre et al. |
| 2005/0103533 A1 | 5/2005 | Sherwood et al. |
| 2006/0032335 A1 | 2/2006 | Kembaiyan |
| 2006/0157276 A1 | 7/2006 | Carothers et al. |
| 2006/0231293 A1 | 10/2006 | Ladi et al. |
| 2006/0254830 A1 | 11/2006 | Radtke |
| 2006/0278436 A1 | 12/2006 | Dykstra et al. |
| 2007/0056776 A1 | 3/2007 | Overstreet |
| 2007/0056777 A1 | 3/2007 | Overstreet |
| 2007/0151770 A1 | 7/2007 | Ganz |
| 2007/0278017 A1 | 12/2007 | Shen et al. |
| 2008/0128174 A1 | 6/2008 | Radford et al. |
| 2008/0128175 A1 | 6/2008 | Radford et al. |
| 2008/0128176 A1 | 6/2008 | Choe et al. |
| 2008/0223622 A1 * | 9/2008 | Duggan ............... E21B 10/55 175/432 |
| 2008/0236900 A1 | 10/2008 | Cooley et al. |
| 2008/0308321 A1 | 12/2008 | Aliko et al. |
| 2009/0000827 A1 | 1/2009 | Bird et al. |
| 2010/0263937 A1 | 10/2010 | Overstreet et al. |
| 2015/0129320 A1 | 5/2015 | Overstreet et al. |

FOREIGN PATENT DOCUMENTS

| | | |
|---|---|---|
| GB | 2326659 A | 12/1998 |
| GB | 2329203 A | 3/1999 |
| WO | 2008112262 A1 | 9/2008 |
| WO | 2009023706 A1 | 2/2009 |

OTHER PUBLICATIONS

Thomson, Ian, et al., "A Systematic Approach to a Better Understanding of the Concentric Hole-Opening Process Utilizing Drilling Mechanics and Drilling Dynamics Measurements Recorded Above and Below the Reamer," IADC/SPE 112647, 20 pages, Copyright 2008, IADC/SPE Drilling Conference.
International Search Report for International Application No. PCT/US2010/031189 dated Jul. 20, 2010, 3 pages.
International Written Opinion for International Application No. PCT/US2010/031189 dated Jul. 20, 2010, 3 pages.
International Preliminary Report on Patentability for International Application No. PCT/US2010/031189 dated Oct. 18, 2011, 4 pages.
Supplementary European Search Report for EP 10765165, dated Aug. 29, 2014, 6 pages.

* cited by examiner

METHODS OF REPAIRING CUTTING ELEMENT POCKETS IN EARTH-BORING TOOLS WITH DEPTH-OF-CUT CONTROL FEATURES

CROSS-REFERENCE TO RELATED APPLICATIONS

This application is a divisional of U.S. patent application Ser. No. 14/602,012, filed Jan. 21, 2015, now U.S. Pat. No. 9,291,002, issued Mar. 22, 2016, which is a divisional of U.S. patent application Ser. No. 12/424,248, filed Apr. 15, 2009, now U.S. Pat. No. 8,943,663, issued Feb. 3, 2015, the disclosure of each of which is incorporated herein in its entirety by this reference.

TECHNICAL FIELD

The present invention relates to methods of forming earth-boring tools having cutting elements disposed in cutting element pockets, and to earth-boring tools and structures formed by such methods.

BACKGROUND

Wellbores are formed in subterranean formations for various purposes including, for example, extraction of oil and gas from subterranean formations and extraction of geothermal heat from subterranean formations. Wellbores may be formed in subterranean formations using earth-boring tools such as, for example, drill bits (e.g., rotary drill bits, percussion bits, coring bits, etc.) for drilling wellbores and reamers for enlarging the diameters of previously-drilled wellbores. Different types of drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters).

To drill a wellbore with a drill bit, the drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom hole assembly" (BHA).

The drill bit may be rotated within the wellbore by rotating the drill string from the surface of the formation, or the drill bit may be rotated by coupling the drill bit to a down-hole motor, which is also coupled to the drill string and disposed proximate the bottom of the wellbore. The down-hole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

It is known in the art to use what are referred to in the art as a "reamers" (also referred to in the art as "hole opening devices" or "hole openers") in conjunction with a drill bit as part of a bottom hole assembly when drilling a wellbore in a subterranean formation. In such a configuration, the drill bit operates as a "pilot" bit to form a pilot bore in the subterranean formation. As the drill bit and bottom hole assembly advances into the formation, the reamer device follows the drill bit through the pilot bore and enlarges the diameter of, or "reams," the pilot bore.

As a wellbore is being drilled in a formation, axial force or "weight" is applied to the drill bit (and reamer device, if used) to cause the drill bit to advance into the formation as the drill bit drills the wellbore therein. This force or weight is referred to in the art as the "weight-on-bit" (WOB).

It is known in the art to employ what are referred to as "depth-of-cut control" (DOCC) features on earth-boring drill bits. For example, U.S. Pat. No. 6,298,930 to Sinor et al., issued Oct. 9, 2001 discloses rotary drag bits that including exterior features to control the depth-of-cut by cutters mounted thereon, so as to control the volume of formation material cut per bit rotation as well as the torque experienced by the bit and an associated bottom-hole assembly. The exterior features may provide sufficient bearing area so as to support the drill bit against the bottom of the borehole under weight-on-bit without exceeding the compressive strength of the formation rock.

BRIEF SUMMARY

In some embodiments, the present invention includes methods of forming earth-boring tools. A cutting element pocket is partially formed in a surface of a body of an earth-boring tool, and a temporary displacement member is inserted into the partially formed cutting element pocket. A particle-matrix composite material is provided over an area of the surface of the body of the earth-boring tool adjacent the partially formed cutting element pocket, and over a portion of a surface of the temporary displacement member. Formation of the cutting element pocket is completed and a depth-of-cut control feature is formed using the particle-matrix composite material.

In additional embodiments, the present invention includes methods of repairing earth-boring tools. A cutting element is removed from a cutting element pocket in a body of an earth-boring tool, and a temporary displacement member is inserted into the cutting element pocket in the body of the earth-boring tool. A depth-of-cut control feature comprising a particle-matrix composite material is provided over a portion of a surface of the temporary displacement member and bonded to the body of the earth-boring tool proximate the temporary displacement member. The depth-of-cut control feature is formed to have a size and shape configured to limit a depth-of-cut of a cutting element to be secured within a cutting element pocket defined by at least one surface of the depth-of-cut control feature and at least one surface of the body of the earth-boring tool.

Additional embodiments of the present invention include methods of repairing earth-boring tools in which hardfacing material is deposited over an area of a surface of a body of an earth-boring tool adjacent a cutting element pocket and over a portion of a surface of a temporary displacement member within the pocket. The hardfacing material is deposited over the temporary displacement member in a volume sufficient to repair the cutting element pocket and form a depth-of-cut control feature from the hardfacing material.

In additional embodiments, the present invention includes earth-boring tools that include a body and a depth-of-cut control feature on a surface of the body. The depth-of-cut control feature comprises a particle-matrix composite material and is configured to limit a depth-of-cut of at least one cutting element secured to the body within a cutting element pocket. The cutting element pocket is partially defined by at least one surface of the body and at least one surface of the depth-of-cut control feature.

Yet further embodiments of the present invention include intermediate structures formed during fabrication of an earth-boring tool. The intermediate structures include a body of an earth-boring tool having at least one surface partially defining a cutting element pocket in the body, a temporary displacement member disposed within the cutting element pocket, and a depth-of-cut control feature on a surface of the body that extends partially over the temporary displacement member.

BRIEF DESCRIPTION OF THE SEVERAL VIEWS OF THE DRAWINGS

While the specification concludes with claims particularly pointing out and distinctly claiming that which is regarded as the present invention, the advantages of embodiments of this invention may be more readily ascertained from the following description of certain embodiments of the invention when read in conjunction with the accompanying drawings, in which:

DETAILED DESCRIPTION

Illustrations presented herein are not meant to be actual views of any particular device or system, but are merely idealized representations that are employed to describe embodiments of the present invention. Additionally, elements common between figures may retain the same numerical designation.

Figure 1:
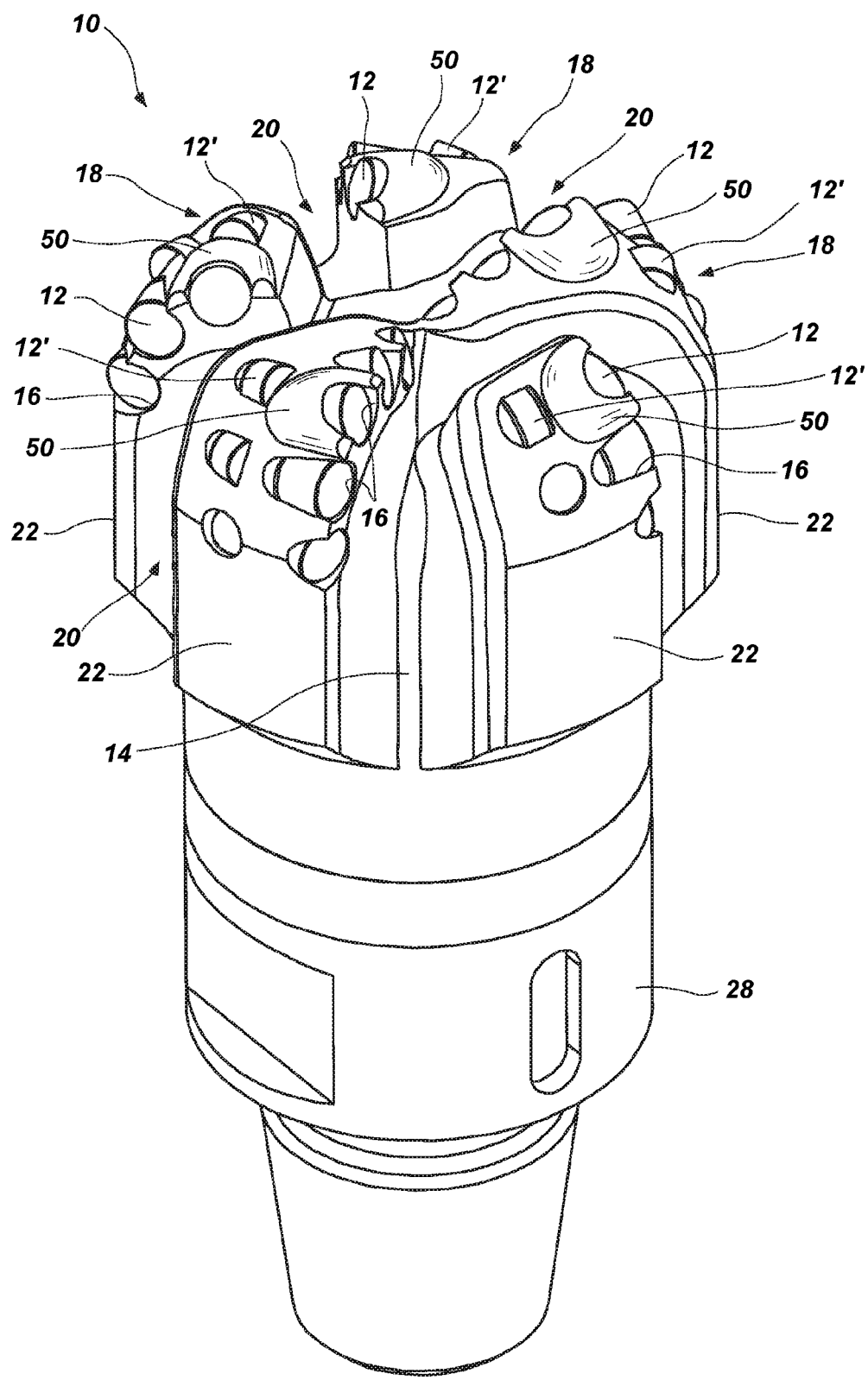
FIG. 1 is a perspective view of an embodiment of an earth-boring tool of the present invention.

An embodiment of a drill bit 10 of the present invention is shown in FIG. 1. The drill bit 10 shown in FIG. 1 is a fixed-cutter rotary drill bit that includes a plurality of cutting elements 12 secured to a bit body 14 within cutting element pockets 16. The bit body 14 includes a plurality of blades 18 that define fluid courses 20 therebetween. A plurality of cutting elements 12 are secured to each of the blades 18. The drill bit 10 further includes a connection portion 28 that is configured for attaching the drill bit 10 to a drill string (not shown) or a down-hole motor (not shown). For example, the connection portion 28 may comprise a threaded pin on a shank attached to the bit body 14 of the drill bit 10. Such a threaded pin may conform to industry standards such as those promulgated by the American Petroleum Institute (API).

The drill string, a down-hole motor (e.g., a hydraulic Moineau-type motor), or both the drill string and the down-hole motor may be used to rotate the drill bit 10 within a wellbore to cause the cutting elements 12 to cut (e.g., shear) away the exposed material of a subterranean formation within the wellbore.

The bit body 14 may be formed from and comprise various materials including, for example, metal alloys (e.g., steel) and particle-matrix composite materials. Such particle-matrix composite materials include, for example, cermet materials comprising hard ceramic particles (e.g., tungsten carbide, titanium carbide, tantalum carbide, boron nitride, silicon carbide, silicon nitride, etc.) embedded within a metal alloy matrix material (e.g., a copper-based alloy, an iron-based alloy, a cobalt-based alloy, a nickel-based alloy, etc.). Bit bodies 14 comprising particle-matrix composite materials can be formed using, for example, infiltration processes as well as pressing and sintering processes, as known in the art.

Each of the blades 18 of the drill bit 10 extends around the face of the bit body 14 from one of a central cone region and a nose region on the face of the bit body 14 to the lateral sides of the bit body 14. Blades 18 that extend from the central cone region of the bit body 14 are referred to as "primary" blades, while the blades 18 that extend from the nose region (but not the central cone region) are referred to as "secondary" blades. Each of the blades extends longitudinally along at least a portion of the lateral sides of the bit body 14. The radial outer-most surfaces of the blades on the lateral sides of the bit body 14 are referred to as gage surfaces 22 of the drill bit 10, and define the largest diameter of the drill bit 10 and, hence, the diameter of the wellbore formed by drilling with the drill bit 10. The sections of the blades 18 that extend longitudinally along the lateral sides of the bit body 14 are referred to as the gage portions of the blades 18. The fluid courses 20 defined between the gage portions of the blades 18 are often referred to in the art as "junk slots."

The cutting elements 12 of the drill bit 10 shown in FIG. 1 comprise polycrystalline diamond compact (PDC) cutting elements, and have a relatively thin layer of polycrystalline diamond material formed on, or attached to, a generally planar end surface of a cylindrical, cobalt-cemented tungsten carbide cutter body. The layer of polycrystalline diamond material on the substrate body is often referred to in the art as a diamond "table." In additional embodiments, the cutting elements 12 may comprise any other type of fixed-cutter cutting element known in the art, such as, for example, cutting elements at least substantially comprised of cemented tungsten carbide that do not have any diamond table thereon.

In some embodiments, the drill bit 10 also may include a plurality of back-up cutting elements 12'. Each back-up cutting element 12' may correspond to, and back up, a primary cutting element 12. In other words, each back-up cutting element 12' may be disposed rotationally behind a primary cutting element 12, but at the same longitudinal and radial position on the drill bit 10, such that the back-up cutting element 12' will follow the primary cutting element 12 to which it corresponds through the same cutting path as the drill bit 10 is used to drill a wellbore. Each back-up cutting element 12' may be mounted to a blade 18 within a cutting element pocket 16 such that the back-up cutting element 12' is partially recessed relative to the surrounding surface of the blade 18.

A relatively large fluid plenum (e.g., a bore) (not shown) extends partially through the bit body 14 of the drill bit 10, and a plurality of fluid passageways (not shown) extend from the fluid plenum to the face of the drill bit 10. Nozzles (not shown) may be fixed to the bit body 14 within these fluid passageways proximate the face of the bit body 14.

As a wellbore is drilled with the drill bit 10, drilling fluid is pumped from the surface of the formation being drilled down through the drill string, through the fluid plenum and the fluid passageways within the bit body 14, and out through the nozzles into the fluid courses 20 between the blades 18 on the exterior of the drill bit 10. The fluid flows around the face of the drill bit 10 through the fluid courses 20, sweeping away formation cuttings and detritus in the process, and into the annular space around the exterior surfaces of the drill string. The fluid flows up through this annular space around the exterior surfaces of the drill string to the surface of the formation, carrying with it the formation cuttings and detritus created by the drilling action of the drill bit 10.

In accordance with embodiments of the present invention, one or more of the cutting element pockets 16 is defined by at least one surface of a depth-of-cut control feature 50 on the face of the drill bit 10. In the embodiment shown in FIG. 1, the drill bit 10 includes one depth-of-cut control feature 50 on a surface of each blade 18 of the bit body 14. The depth-of-cut control features 50 comprise a relatively wear-resistant material such as, for example, a particle-matrix composite material comprising hard particles (e.g., tungsten carbide, titanium carbide, tantalum carbide, boron nitride, silicon carbide, silicon nitride, etc.) embedded within a metal alloy matrix material (e.g., a copper-based alloy, an iron-based alloy, a cobalt-based alloy, a nickel-based alloy, etc.). In some embodiments, the depth-of-cut control features 50 may comprise what is referred to in the art as a "hardfacing" material, which is a particle-matrix composite material that may be applied to surfaces of a body using welding techniques (e.g., oxy-acetylene welding (OAW) processes, metal-inert gas (MIG) welding processes, tungsten-inert gas (TIG), plasma arc welding (PAW) processes (including (plasma-transferred arc welding (PTAW) processes), and flame-spray processes.

In the embodiment shown in FIG. 1, one depth-of-cut control feature 50 is provided on each of the blades 18. Each depth-of-cut control feature 50 partially surrounds a cutting element 12 on a nose region on the face of the drill bit 10, and is configured (e.g., sized and shaped) so as to limit a depth-of-cut of the corresponding cutting element 12 that is partially surrounded by the depth-of-cut control feature 50. By limiting the depth-of-cut of the cutting elements 12 that are partially surrounded by the depth-of-cut control features 50, the depth-of-cut control features 50 may effectively (e.g., indirectly) limit the depth-of-cut of other cutting elements 12 of the drill bit 10.

In additional embodiments of the invention, the drill bit 10 may include more or less of the depth-of-cut control features 50. For example, each of the cutting elements 12 of the drill bit 10 may be partially surrounded by a depth-of-cut control feature 50. In other embodiments, cutting elements 12 in other regions of the drill bit (i.e., in one or more of the central cone region, the shoulder region, and the gage region) may be partially surrounded by depth-of-cut control features 50.

Figure 2:
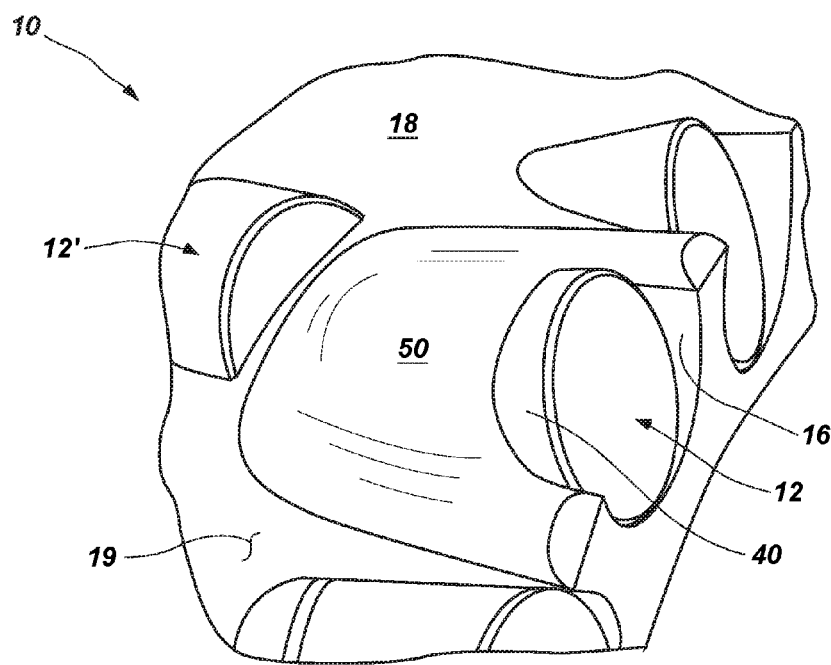
FIG. 2 is an enlarged view of a portion of the earth-boring tool of FIG. 1 illustrating a cutting element disposed in a cutting element pocket at least partially defined by a depth-of-cut control feature.

FIG. 2 is an enlarged view of a portion of the drill bit 10 of FIG. 1 illustrating a depth-of-cut control feature 50 that at least partially surrounds a cutting element 12 on one of the blades 18 of the drill bit 10. As shown in FIG. 2, the depth-of-cut control feature 50 is disposed on, and bonded to, an area on a surface 19 of the blade 18 that is rotationally behind the cutting element 12, as well as areas on the lateral sides of the cutting element 12. Thus, forces acting on the depth-of-cut control feature 50 by a surface of a formation rubbing against the depth-of-cut control feature 50 are transferred to the blade 18 of the drill bit 10. The depth-of-cut control feature 50 also extends over a portion of the cutting element 12. In particular, the depth-of-cut control feature 50 extends over a substantial portion (e.g., greater than about 50%) of an area of a cylindrical side surface 40 of the cutter body of the cutting element 12 that is exposed outside of the blade 18. In other words, of the area of the cylindrical side surface 40 of the cutter body not bonded to the blade 18, a substantial portion (e.g., greater than about 50%) of this area may be bonded to the depth-of-cut control feature 50. The depth-of-cut control feature 50 also may be bonded to an area of a substantially planar back (i.e., rotationally trailing) surface 42 (FIG. 3) of the cutter body of the cutting element 12.

Figure 3:
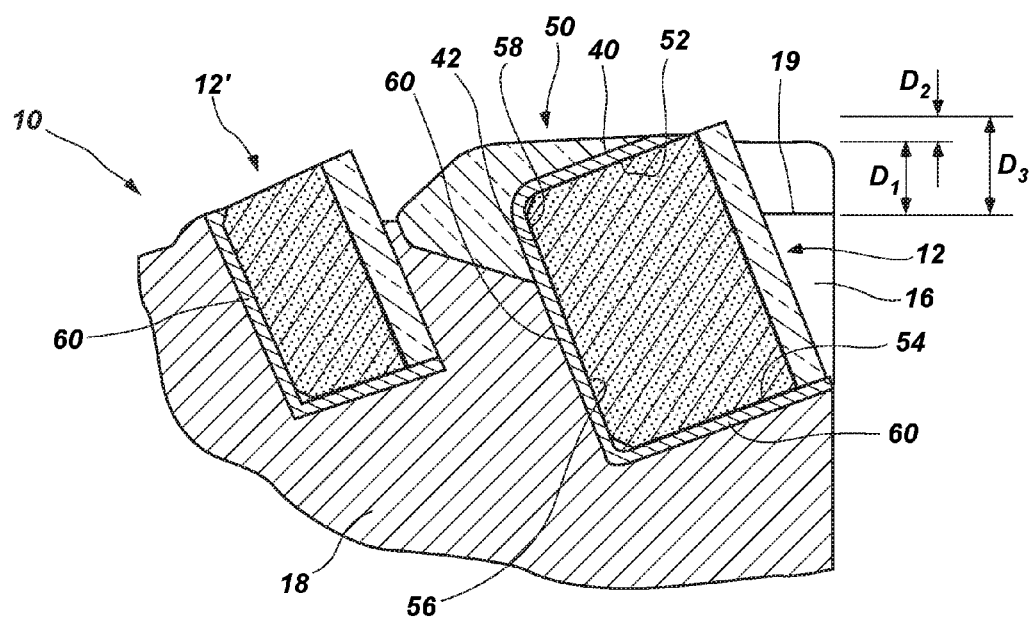
FIG. 3 is a cross-sectional view of the cutting element and the depth-of-cut control feature shown in FIG. 2.

FIG. 3 is a cross-sectional view of the cutting element 12 and the depth-of-cut control feature 50 shown in FIG. 2. As shown in FIG. 3, the cutting element pocket 16 is partially defined by an arcuate surface 52 of the depth-of-cut control feature 50, and partially defined by an arcuate surface 54 of the blade 18 of the bit body 14. The arcuate surface 52 of the depth-of-cut control feature 50 and the arcuate surface 54 of the blade 18 of the bit body 14 may be coextensive with one another to define an at least substantially cylindrical surface of the cutting element pocket 16 that is sized and configured to be disposed adjacent the at least substantially cylindrical lateral side surface 40 of the cutter body of the cutting element 12. The cutting element pocket 16 is further partially defined by a back surface, which may be at least substantially planar in some embodiments. For example, the substantially planar back surface may comprise a planar surface 56 of the blade 18 of the bit body 14, a planar surface 58 of the depth-of-cut control feature 50, or both a planar surface 56 of the blade 18 of the bit body 14 and a planar surface 58 of the depth-of-cut control feature 50, the planar surface 56 and the planar surface 58 being coextensive and continuous with one another, as shown in FIG. 3.

The cutting element 12 may be secured to the blade 18 of the bit body 14 and the depth-of-cut control feature 50 within the cutting element pocket 16 using a bonding material 60. The bonding material 60 may comprise a metal alloy having a relatively low melting point (e.g., below about 1,300° F. (e.g., a silver-based brazing alloy). A substantially uniform, minimal gap (e.g., between about one thousandth (0.001) of an inch and about eight thousands (0.008) of an inch) may be provided between the cutting element 12 and the surfaces defining the cutting element pocket 16 to provide clearance for the bonding material 60. The gap between the cutting element 12 and the surfaces defining the cutting element pocket 16 may be selected to increase (e.g., maximize) capillary forces that are used to draw the bonding material 60, in a liquid state, into the gap between the cutting element 12 and the surfaces defining the cutting element pocket 16 after positioning the cutting element 12 within the cutting element pocket 16.

As shown in FIG. 3, the depth-of-cut control feature 50 extends a predetermined distance $D_1$ above the surface 19 of the blade 18 of the bit body 14 adjacent the cutting element pocket 16. Thus, the depth-of-cut of the cutting element 12 is limited to a depth $D_2$ defined as the difference between distance $D_3$ by which the cutting element 12 protrudes from the surface 19 of the blade 18 of the bit body 14 adjacent the cutting element pocket 16, and the predetermined distance $D_1$ by which the depth-of-cut control feature 50 extends above the surface 19 of the blade 18 of the bit body 14 adjacent the cutting element pocket 16.

In some embodiments of the present invention, each depth-of-cut control feature 50 may comprise a predetermined minimum surface area at the predetermined distance $D_1$ above the surface of the blade 18 of the bit body 14 adjacent the cutting element pocket 16. Furthermore, the sum of these areas of these depth-of-cut control features 50 may provide a total "rubbing area" on the depth-of-cut control features 50 that is configured to distribute the forces applied to the formation by the drill bit 10, due to the weight-on-bit, over a sufficiently large area such that the stresses applied to the areas of the formation in contact with the depth-of-cut control features 50 by the drill bit 10 will not exceed the confined compressive strength of the formation, which could result in crushing of the areas of the formation that are in contact with and rubbing against the depth-of-cut control features 50. Such crushing of the formation by the depth-of-cut control features 50 may be an undesirable phenomenon during the drilling process, resulting in an excessive depth-of-cut, the potential for bit balling and excessive torque such that, if a down-hole motor is used, stalling may occur.

As previously discussed, in some embodiments, the drill bit 10 may include a plurality of back-up cutting elements 12' that are configured and positioned to back up a plurality of primary cutting elements 12. FIG. 3 illustrates a single primary cutting element 12 and a single back-up cutting element 12' that is configured and positioned to back up the primary cutting element 12. The primary cutting element 12 may be disposed in a cutting element pocket 16 that is at least partially defined by a depth-of-cut control feature 50, as previously discussed herein. In some embodiments of the present invention, the exposure of the back-up cutting element 12' may be selected in relation to the predetermined distance $D_1$ by which the depth-of-cut control feature 50 extends above the surface 19 of the blade 18 of the bit body 14 adjacent the cutting element pocket 16. In other words, the distance by which the back-up cutting element 12' extends above the surface 19 of the blade 18 of the bit body 14 may be selected in relation to the predetermined distance $D_1$ by which the depth-of-cut control feature 50 extends above the surface 19 of the blade 18 of the bit body 14. For example, in some embodiments, the exposure of the back-up cutting element 12' may be substantially equal to the predetermined distance $D_1$ by which the depth-of-cut control feature 50 extends above the surface 19 of the blade 18 of the bit body 14.

As another example, the exposure of the back-up cutting element 12' initially (upon manufacture of the drill bit 10) may be less than the predetermined distance $D_1$ by which the depth-of-cut control feature 50 extends above the surface 19 of the blade 18 of the bit body 14. Thus, as the drill bit 10 is used to drill a wellbore, the depth-of-cut control feature 50 will initially prevent the back-up cutting element 12' from engaging and cutting the formation material. However, as the depth-of-cut control feature 50 wears away, the back-up cutting element 12' will eventually engage with and begin to cut the formation material. In some embodiments, the depth-of-cut control feature 50 may have a shape that causes the area of the depth-of-cut control feature 50 in contact with the formation to increase as the depth-of-cut control feature 50 wears away. Thus, at the time the back-up cutting element 12' engages the formation, the area of the depth-of-cut control feature 50 in contact with the formation may be larger than an area of the depth-of-cut control feature 50 in contact with the formation upon initial commencement of the drilling process.

As a result, the exposure of the back-up cutting elements 12' and the shape of the depth-of-cut control features 50 may be selected and configured such that, at the time the depth-of-cut control features 50 have worn to an extent that results in initial engagement of the back-up cutting elements 12' with the formation, the area of the depth-of-cut control features 50 in contact with and rubbing against the formation will be at least equal to a predetermined minimum surface area. As previously discussed, this minimum surface area may be large enough that the stresses applied to the areas of the formation in contact with the depth-of-cut control features 50 by the drill bit 10 will not exceed the confined compressive strength of the formation.

In some embodiments of the present invention, the depth-of-cut control features 50 may be formed from and at least substantially comprised of a hardfacing material of at least substantially similar material composition. In additional embodiments, at least one depth-of-cut control feature 50 may be formed from a hardfacing material having a material composition that differs from the material composition of another, different hardfacing material used to form another depth-of-cut control feature 50 on the drill bit 10. For example, one hardfacing material used to form a depth-of-cut control feature 50 may exhibit a relatively higher wear resistance relative to different hardfacing material used to form another different depth-of-cut control feature 50 of the drill bit 10.

An embodiment of a method of the present invention that may be used to form an earth-boring tool, such as the drill bit 10 shown in FIGS. 1 through 3, is described below with reference to FIGS. 4 through 6.

Figure 4:
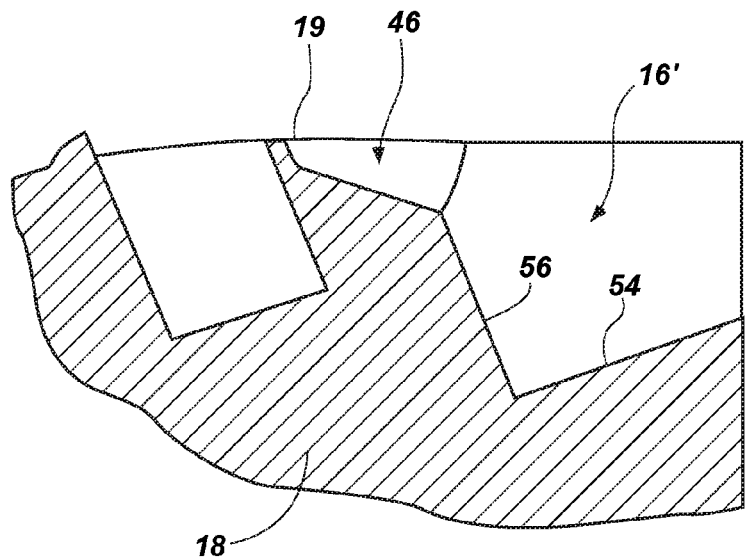
FIG. 4 is a cross-sectional view of a body of an earth-boring tool illustrating a partially-formed cutting element pocket in the body.

Referring to FIG. 4, the bit body 14 (FIG. 1) (including the blades 18 thereof) may be fabricated using conventional processes known in the art. In some embodiments, however, the outer surfaces 19 of the blades 18 proximate one or more of the cutting element pockets 16 (FIG. 1) may be recessed relative to previously known bit bodies 14 of comparable configuration. In other words, a recess 46 may be formed in the surface 19 of the blade 18 proximate (e.g., adjacent and rotationally behind) one or more of the cutting element pockets 16 to be formed therein. In FIG. 4, a partially formed cutting element pocket 16' extends into the blade 18 of the bit body 14. The partially formed cutting element pocket 16' shown in FIG. 4 includes an arcuate surface 54 of the blade 18 of the bit body 14 (which may be at least substantially cylindrical and define a partial cylinder), as well as an at least substantially planar surface 56 of the blade 18 of the bit body 14 that intersects the arcuate surface 54 and is oriented generally perpendicular to the arcuate surface 54 along the intersection therebetween.

Figure 5:
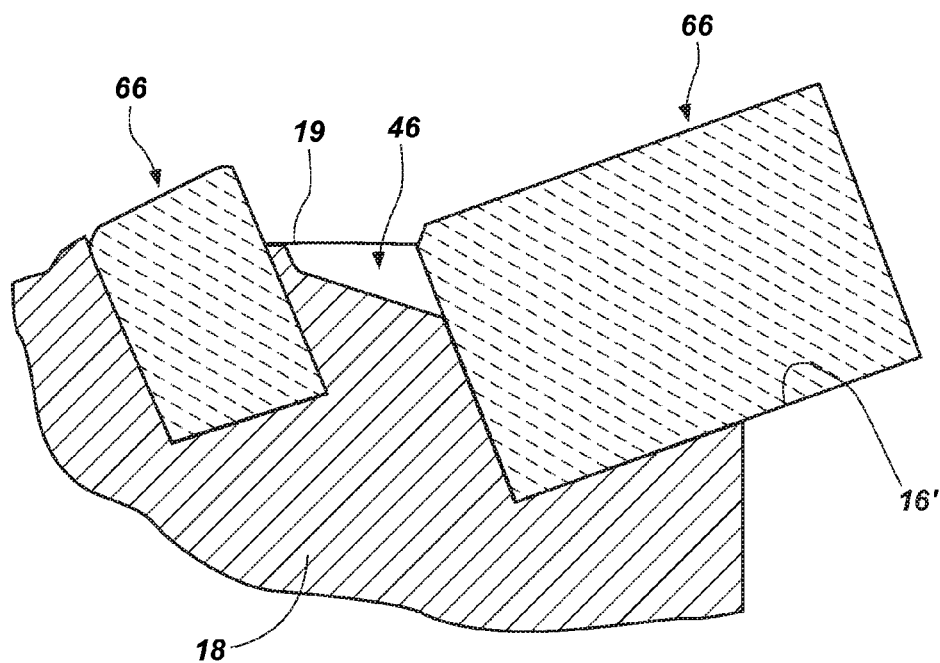
FIG. 5 is a cross-sectional view like that of FIG. 4 illustrating a temporary displacement member disposed within the partially-formed cutting element pocket in the body of the earth-boring tool.

Referring to FIG. 5, a temporary displacement member 66 may be inserted into, and secured within, the partially formed cutting element pocket 16' in the blade 18 of the bit body 14 (FIG. 1). A temporary displacement member 66 also may be inserted into, and secured within, any cutting element pocket or partially formed cutting element pocket in the blade 18 that is configured to receive back-up cutting elements 12' therein, as previously described in relation to FIGS. 1 and 3.

The temporary displacement member 66 may comprise, for example, graphite or a porous ceramic material (e.g., a ceramic oxide of Al, Si, Mg, Y, etc.) that may be subsequently removed from the cutting element pocket 16, as described below. By way of example and not limitation, the temporary displacement member 66 may comprise aluminum oxide ($Al_2O_3$), silicon oxide ($SiO_2$), or a combination of aluminum oxide and silicon oxide. As one non-limiting example, the temporary displacement member 66 may comprise approximately 95% by weight aluminum oxide, and about 5% by weight silicon oxide. Furthermore, the temporary displacement member 66 may have a size and shape at least substantially similar to that of a cutting element 12 to be subsequently secured within the cutting element pocket 16. For example, if the cutting element 12 is at least substantially cylindrical, the temporary displacement member 66 also may be at least substantially cylindrical and may have a diameter at least substantially equal to that of the cutting element 12 (although the temporary displacement member 66 may be longer or shorter than the cutting element 12).

The temporary displacement member 66 may be secured within the partially formed cutting element pocket 16' (FIG. 4) using, for example, an adhesive such as, for example, an epoxy material or another adhesive material that will not significantly degrade, until desired, upon further processing (e.g., an epoxy or adhesive that can be used at temperatures up to about 1,000° F. or more). In additional embodiments, the temporary displacement member 66 may be secured within the partially formed cutting element pocket 16' by providing an interference fit or a shrink fit between the temporary displacement member 66 and the surrounding surfaces of the blade 18 of the bit body 14.

Figure 6:
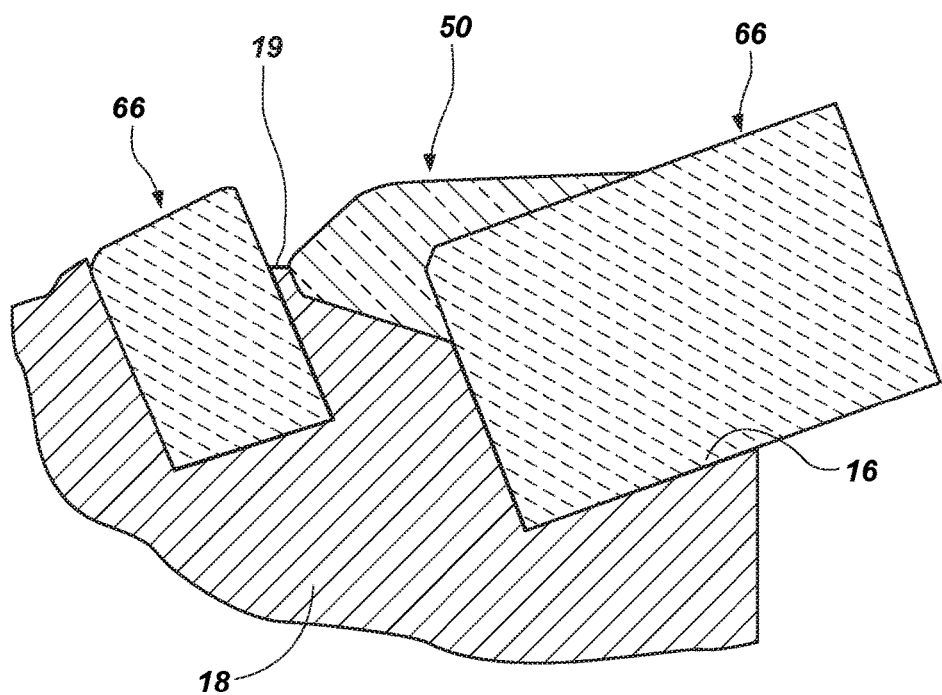
FIG. 6 is a cross-sectional view like that of FIG. 5 illustrating a depth-of-cut control feature disposed over the temporary displacement member and a portion of the body adjacent the temporary displacement member.

Referring to FIG. 6, after securing the temporary displacement member 66 within the partially formed cutting element pocket 16' in the blade 18 of the bit body 14 (FIG. 1), a depth-of-cut control feature 50 may be formed or otherwise provided over at least a portion of the temporary displacement member 66 and a portion of the surface 19 of the blade 18 of the bit body 14 adjacent the temporary displacement member 66. Provision of the depth-of-cut control feature 50 over the temporary displacement member 66 and the surrounding surface 19 of the blade 18 may complete the formation of the cutting element pocket 16 in the drill bit 10.

As previously discussed, in some embodiments, the depth-of-cut control feature 50 may comprise a particle-matrix composite material. In such embodiments, such a particle-matrix composite material may be deposited or otherwise provided over the temporary displacement member 66 and the surrounding surface 19 of the blade 18 to complete the formation of the cutting element pocket 16 and to form the depth-of-cut control feature 50. Furthermore, in embodiments in which the particle-matrix composite material comprises a hardfacing material, the hardfacing material may be deposited over the temporary displacement member 66 and the surrounding surface 19 of the blade 18 using a welding process. As hardfacing material is deposited over and adjacent the temporary displacement member 66 and the surrounding surface 19 of the blade 18, the hardfacing material may be built up through sequential depositions or overlays of beads or layers of welding material to form the depth-of-cut control feature 50 and complete the formation of the cutting element pocket 16 using the hardfacing material.

As previously discussed with reference to FIG. 3, the hardfacing material may be built up over the temporary displacement member 66 and the surrounding surface 19 of the blade 18 until the hardfacing material projects from the surface of the blade 18 by a predetermined distance $D_1$ (FIG. 3). Furthermore, as previously discussed with reference to FIG. 3, the hardfacing material may be built up to provide a predetermined minimum surface area of the hardfacing material at the predetermined distance $D_1$ over the surface of the blade 18 of the bit body 14.

In additional embodiments of the present invention, the depth-of-cut control feature 50 may be separately formed from the blade 18 of the bit body 14 and subsequently attached thereto. As a non-limiting example, the depth-of-cut control feature 50 may comprise a cemented carbide structure (e.g., a structure formed from and at least substantially comprising a cobalt-cemented tungsten carbide material). Such a cemented carbide structure may be formed by using pressing and sintering techniques, such as techniques substantially similar to those conventionally used to form cemented tungsten carbide inserts for drill bits and other earth-boring tools. Such a separately formed depth-of-cut control feature 50 may then be attached to the blade 18 of the bit body 14 using a bonding material, such as the bonding material 60 previously described herein and used to secure the cutting element 12 within the cutting element pocket 16.

After forming or otherwise providing the depth-of-cut control feature 50 on the drill bit 10, the temporary displacement member 66 may be removed from the cutting element pocket 16. In some instances, it may be possible to simply pull the depth-of-cut control feature 50 out from the cutting element pocket 16 by hand or with the assistance of a tool or tools, such as, for example, pliers. In other instances, the temporary displacement member 66 may be fractured (e.g., using a chisel and/or a hammer) within the cutting element pocket 16, and the resulting pieces of the fractured temporary displacement member 66 may be removed from the cutting element pocket 16. In other instances, the temporary displacement member 66 may be ground or blasted (e.g., sand-blasted) out from the cutting element pocket 16. Furthermore, combinations of the above mentioned techniques may be used to completely remove the temporary displacement member 66 from the cutting element pocket 16.

After removing the temporary displacement member 66 from the cutting element pocket 16, a cutting element 12 may be inserted into the cutting element pocket 16 and secured therein using a bonding material 60 using conventional processes known in the art. If employed, a back-up cutting element 12' also may be secured within a cutting element pocket using a bonding material 60.

Additional embodiments of methods of the present invention may be used to repair a drill bit or another earth-boring tool. For example, after the drill bit 10 has been used to drill a wellbore, one or more of the cutting elements 12 may be removed from the cutting element pockets 16. A temporary displacement member 66 then may be secured within the cutting element pockets 16. A depth-of-cut control feature 50 then may be formed or otherwise provided over the temporary displacement member 66 and the surrounding surface 19 of the blade 18, as previously described herein. For example, the depth-of-cut control feature 50 may be formed by depositing hardfacing material over an area of the surface 19 of the blade 18 of the bit body 14 adjacent the cutting element pocket 16, as well as over a surface of the temporary displacement member 66. The hardfacing material may be built up over the temporary displacement member 66 to repair the cutting element pocket 16 and form the depth-of-cut control feature 50 from the hardfacing material. Furthermore, the hardfacing material may be built up over the temporary displacement member 66 and the surrounding surface 19 of the blade 18 sufficiently until the hardfacing material projects from the surface of the blade 18 by a predetermined distance $D_1$ (FIG. 3) when repairing the drill bit 10. Furthermore, as previously discussed with reference to FIG. 3, the hardfacing material may be built up to provide a predetermined minimum surface area of the hardfacing material at the predetermined distance $D_1$ above the surface of the blade 18 of the bit body 14 when repairing the drill bit 10.

Although embodiments of the present invention have been described with reference to a fixed-cutter earth-boring rotary drill bit 10, it is understood that embodiments of methods of the present invention may be used to form other earth-boring tools including, for example, other types of drill bits (e.g., rotary roller cone bits, hybrid bits, percussion bits, coring bits, bi-center bits, eccentric bits, etc.), reamers, mills, and any other earth-boring tools that might include a cutting element secured within a cutting element pocket and employ one or more depth-of-cut control features.

While the present invention has been described herein with respect to certain embodiments, those of ordinary skill in the art will recognize and appreciate that it is not so limited. Rather, many additions, deletions and modifications to the embodiments described herein may be made without departing from the scope of the invention as hereinafter claimed, and legal equivalents thereof. In addition, features from one embodiment may be combined with features of another embodiment while still being encompassed within the scope of the invention as contemplated by the inventor.

What is claimed is:

1. An earth-boring tool, comprising:
   a body; and
   a depth-of-cut control feature on a surface of the body, the depth-of-cut control feature comprising a particle-matrix composite material and configured to limit a depth-of-cut of at least one cutting element secured to the body within a pocket, wherein the pocket is partially defined by at least one surface of the body and at least one surface of the depth-of-cut control feature;
   a cutting element located within the pocket; and
   a bonding material located between the cutting element and the depth-of-cut control feature over at least a substantial surface area of the at least one surface of the depth-of-cut control feature, the bonding material at least partially securing the cutting element within the pocket;
   wherein the depth-of-cut control feature extends above the at least one surface of the body and over a portion of the cutting element.

2. The earth-boring tool of claim 1, wherein the depth-of-cut control feature comprises a deposit of hardfacing material.

3. The earth-boring tool of claim 2, wherein the deposit of hardfacing material extends a predetermined distance above the surface of the body adjacent the pocket.

4. The earth-boring tool of claim 3, wherein the deposit of hardfacing material comprises a predetermined minimum surface area at the predetermined distance above the surface of the body adjacent the pocket.

5. The earth-boring tool of claim 1, wherein the bonding material comprises a braze metal or braze alloy.

6. The earth-boring tool of claim 5, wherein the braze metal or braze alloy comprises a silver-based brazing alloy.

7. The earth-boring tool of claim 1, wherein a surface area of the at least one surface of the body partially defining the pocket is less than a surface area of another surface of the body defining another pocket.

8. The earth-boring tool of claim 1, wherein a surface area of a second surface of the body defining a second pocket is at least substantially equal to the surface area of the at least one surface of the body partially defining the pocket added to a surface area of the at least one surface of the depth-of-cut control feature partially defining the pocket.

9. The earth-boring tool of claim 1, wherein a maximum thickness of the bonding material is between 0.001 inch and 0.008 inch.

10. The earth-boring tool of claim 1, wherein a melting point of the bonding material is 1,300° F. or less.

11. The earth-boring tool of claim 1, wherein an arcuate surface of the depth-of-cut control feature and an arcuate surface of the body are at least substantially coextensive with one another to define an at least substantially cylindrical surface of the pocket.

12. The earth-boring tool of claim 1, wherein an at least substantially planar surface of the pocket comprises an at least substantially planar surface of the body, an at least substantially planar surface of the depth-of-cut control feature, or both an at least substantially planar surface of the body and an at least substantially planar surface of the depth-of-cut control feature, the at least substantially planar surface of the body and the at least substantially planar surface of the depth-of-cut control feature being coextensive with one another.

13. The earth-boring tool of claim 1, further comprising a backup cutting element secured to the body in a location at least substantially rotationally following the cutting element.

14. The earth-boring tool of claim 13, wherein an exposure of the backup cutting element is less than or at least substantially equal to a distance to which the depth-of-cut control feature extends above the body.

* * * * *